Oct. 3, 1939.   L. F. CARTER ET AL   2,174,777
DIRECTIONAL GYROSCOPE
Original Filed Feb. 28, 1934   2 Sheets-Sheet 2

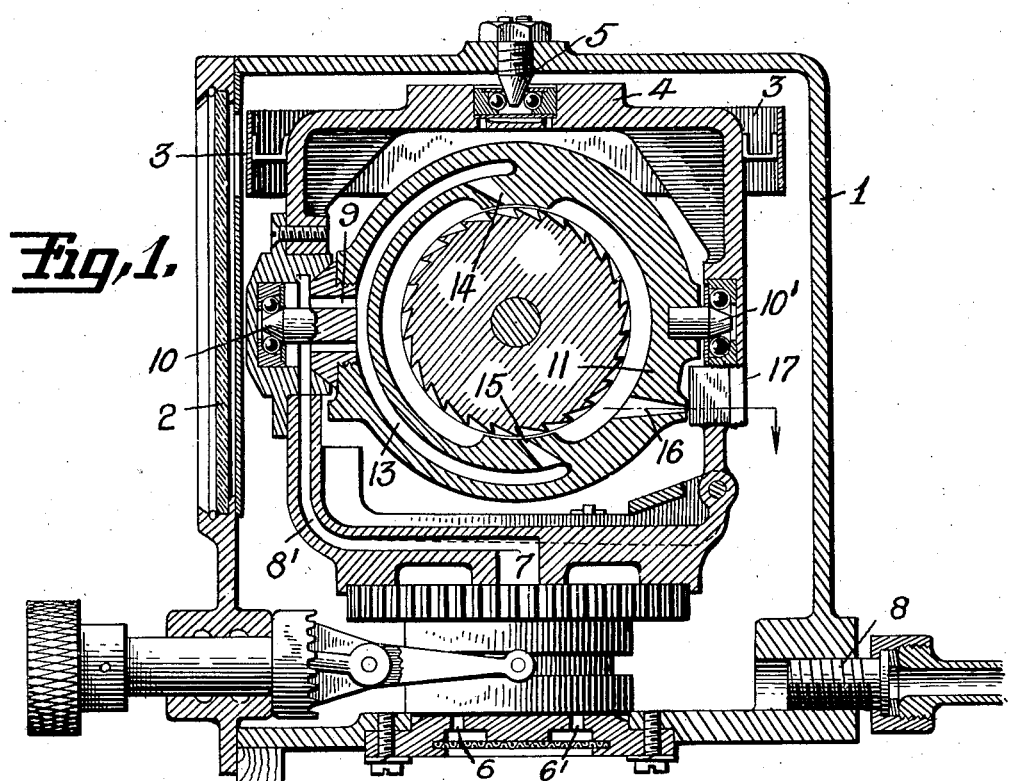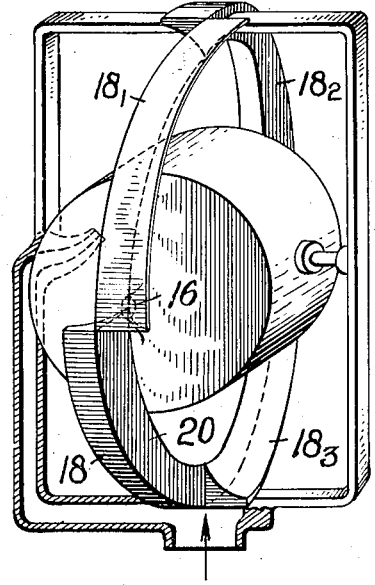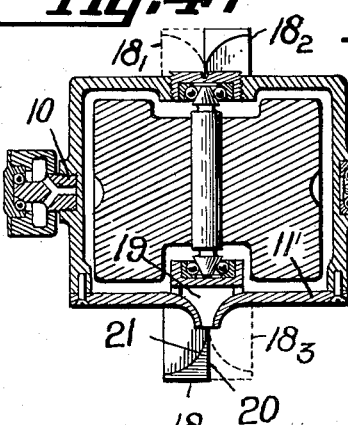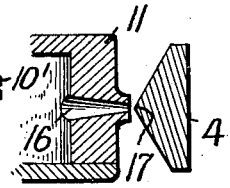

INVENTORS
Leslie F Carter
Athelston F Spilhaus
BY
Herbert H. Thompson
THEIR ATTORNEY Patented Oct. 3, 1939

2,174,777

UNITED STATES PATENT OFFICE 2,174,777

DIRECTIONAL GYROSCOPE

Leslie F. Carter, Leonia, N. J., and Athelstan F. Spilhaus, New York, N. Y., assignors to Sperry Gyroscope Company, Inc., Brooklyn, N. Y., a corporation of New York Application February 28, 1934, Serial No. 713,288
Renewed February 24, 1939

5 Claims. (Cl. 74—5)

This invention relates to directional gyroscopes especially adapted to supplement magnetic compasses in the navigation of aircraft. Such gyroscopes are usually given three degrees of freedom so that they are uninfluenced by gravity or other acceleration forces and are usually mounted with a substantially horizontal spinning axis and for oscillation about a second horizontal axis at right angles thereto and for turning about a vertical axis. Such gyroscopes, however, are only effective as long as the spinning axis remains substantially horizontal. We are aware that heretofore it has been proposed to maintain the spinning axis substantially horizontal by the aligning action of a spinning jet or jets positioned in the vertical ring. Such an arrangement, however, necessitates the gyro rotor having no casing to enclose the same, since the jets do not tilt with the rotor. Enclosing the rotor is desirable for several reasons, namely, a close fitting housing eliminates stray and variable eddy effects and whatever turbulence takes place within the casing remains constant, irrespective of the inclination. The resulting decrease of turbulence and windage loss also results in increased speed of the rotor.

A further object of our invention is to secure an erecting torque for the gyro case which is a pure torque around the vertical axis so that no wandering in azimuth is caused thereby. This may be conveniently accomplished by directing the discharged air from the rotor casing against a wedge shaped member or blade mounted on a normally vertical part, such as the vertical ring, so that when the gyro casing tilts a torque will be exerted from the vertical axis of the ring, which of course is communicated to the rotor casing.

Other objects of our invention will be apparent from the following description.

Referring to the drawings showing several forms our invention may assume:

Fig. 1 is a vertical section through a directional gyro constructed according to one form of our invention.

Fig. 2 is a detail of the same, showing the air deflecting blade on the vertical ring.

Fig. 3 is a perspective view of the vertical ring and gyro casing only of a modified form of the invention.

Fig. 4 is a horizontal section of the same through the horizontal trunnions of the gyro casing.

Figure 6:
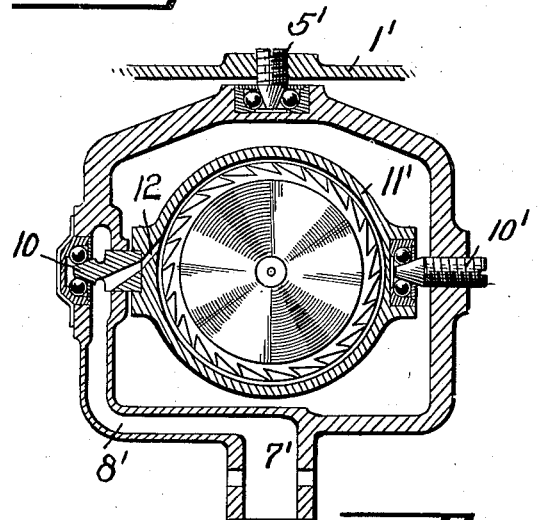
Fig. 6 is a detail showing the rotor spinning nozzle.

The directional gyro in Fig. 1 is shown as enclosed within an outer casing 1 having a front window 2 through which is visible the compass card 3, secured to the vertical ring 4 of the gyroscope. Said ring is pivoted for turning about a vertical axis within the casing in an upper pivot 5 and a lower pivot (not shown), through which air is taken through channels 6, 6' and 7 for spinning the gyroscope. Such gyroscopes are usually spun by withdrawing air from the interior of the closed casing 1 through a pipe connection 8, so that the air under atmospheric pressure enters through the channels 6 and 7, passes through the channel 8' in the vertical ring, and thence through channels 9 in one of the horizontal trunnions 10 and 10' of the rotor casing 11 which encloses the rotor on all sides so as to reduce turbulence and eddy current losses. The spinning air may be discharged through a jet 12 directly against the gyro rotor, as in Fig. 6, or it may be carried through a channel 13 in the rotor bearing casing to upper and lower nozzles 14 and 15 (Fig. 1). Air is then discharged from the casing through an additional nozzle or opening 16, which is shown as located to one side of or below the trunnion axis 10—10'. Said air is discharged against a deflection plate or baffle 17, which may form a part of or which is fixed to a normally vertical part such as the vertical ring 4. It will be readily apparent that as the gyro casing tilts, the jet 16 will be displaced from the central position shown in Fig. 2 so that a greater force will be exerted on the baffle 17 around the vertical axis in one direction than in the other, which will result in the gyroscope being rapidly restored to its horizontal position.

Figure 5:
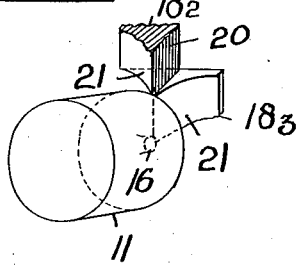
Fig. 5 is a detail or diagram showing the action of the air against the double blade employed in this form of the invention.

Such a device, however, would not work in case the airplane somersaulted or flew upside down. A form of the invention to take care of these unusual conditions is shown in Figs. 3 to 5. According to this form the vertical ring has secured thereto a circular knife edge baffle 18 against which an air jet 16, discharged axially from the gyro casing 11', impinges. Said knife edge is shown as made up of several sectors 18, 18₁, 18₂ and 18₃, each sector being shown as approximately 90 degrees. Each sector has one flat side 20 lying parallel to the plane of the air flow from the jet, and a second side 21 at an angle thereto so as to receive a side thrust from the jet. At each 90 degree point the two flat sides are interchanged so that the direction of the torque exerted by the jet is reversed. Normally the nozzle lies as shown in Fig. 3, so that the jet strikes along the line of division between the sectors 18 and 18₁. In case, however, the gyro casing becomes inclined slightly, the jet moves up or down to engage one sector more than the other, with the resulting torque about the vertical axis. By employing several sectors the torque will always be in the right direction to maintain the gyro in the horizontal position without upsetting the same after maneuvers of the plane.

Figure 7:
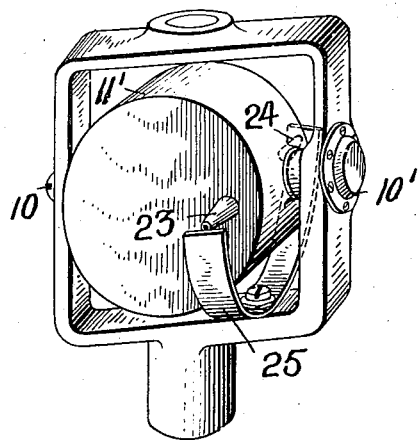
Fig. 7 is a perspective view showing a still further modification.

Fig. 7 shows a further modification in which two jets 23 and 24 are discharged in opposite axial directions from the casing 11' to one side of the vertical axis thereof, but in line with the horizontal trunnion axis, and a semicircular shutter 25 is fixed to the vertical ring and normally bisects each jet. As will be readily apparent, upon tilt of the casing with respect to the vertical ring an unbalanced torque would be exerted about the vertical axis in this construction as well as in one of the constructions described above.

One advantage of using the vertical ring as the base line for the deflecting blade instead of an independently mounted pendulum is that the vertical ring does not change its inclination so readily as a small pendulum in the presence of acceleration forces and hence the gyro is not so easily or so often disturbed.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a directional gyroscope, a rotor, a rotor bearing frame mounting the rotor for spinning about a normally horizontal axis, a vertical ring in which said frame is mounted for oscillation about a second horizontal axis and an outer frame mounting said ring for turning about a vertical axis, means for discharging air from said frame parallel to the rotor spin axis, a circular baffle having four quadrants secured to said vertical ring, each quadrant having a flat side in line with the jet from said nozzle and the other side at an angle thereto and each quadrant having the two sides reversed with respect to adjacent quadrants, whereby the proper erecting force may be exerted regardless of the flying attitude of the aircraft on which it is mounted.

2. In a directional gyroscope, the combination with a rotor and rotor bearing casing, a vertical ring mounting for rotation about a vertical axis, within which said casing is mounted for oscillation about a horizontal axis, means for leading air into and along said axis within said casing for spinning said rotor, a port for discharging the used air from said casing located normally in the same horizontal plane as said horizontal axis, and baffle means on said ring in the path of the jet from said port on which said jet exerts unbalanced torques about the vertical axis of said ring upon inclination of said casing.

3. In a directional gyroscope, a rotor, a rotor bearing casing enclosing the same and mounting the same for spinning about a normally horizontal axis, a fixed jet within the casing for spinning said rotor, means for mounting said casing for oscillation about a second horizontal axis and turning about a vertical axis, means for discharging air from said casing substantially parallel to the spin axis of the rotor, and means including a baffle member for intercepting the jet therefrom to exert unbalanced torque about the vertical axis of said gyroscope upon tilting of said casing in the proper direction to erect the same.

4. In a directional gyroscope, a rotor, a rotor bearing frame mounting the rotor for spinning about a normally horizontal axis, means for mounting said frame for oscillation about a second horizontal axis and turning about a vertical axis, means for discharging air from said frame substantially parallel to the spin axis of the rotor, and means including a baffle member for intercepting the jet therefrom to exert unbalanced torque about the vertical axis of said gyroscope upon tilting of said casing in the proper direction to erect the same, said baffle member being in the form of a knife edge facing said jet and beveled on one side only above the horizontal plane of said horizontal axis and being beveled on said other side below said plane.

5. In a directional gyroscope, the combination with a vertical ring mounted for rotation about a vertical axis, a rotor bearing frame pivotally mounted therein about a horizontal axis, with the rotor spin axis normally horizontal and at right angles to said other horizontal axis, a vertically disposed divided baffle member and an air jet, one of which is mounted on said frame and the other on said ring, so that said jet normally strikes said baffle at its division point, the two halves of said baffle deflecting the jet oppositely to exert torques in either direction about the vertical axis of said gyroscope, as said frame becomes inclined in either direction, whereby the spin axis is maintained horizontal.

LESLIE F. CARTER.
ATHELSTAN F. SPILHAUS.